Patented Apr. 7, 1925.

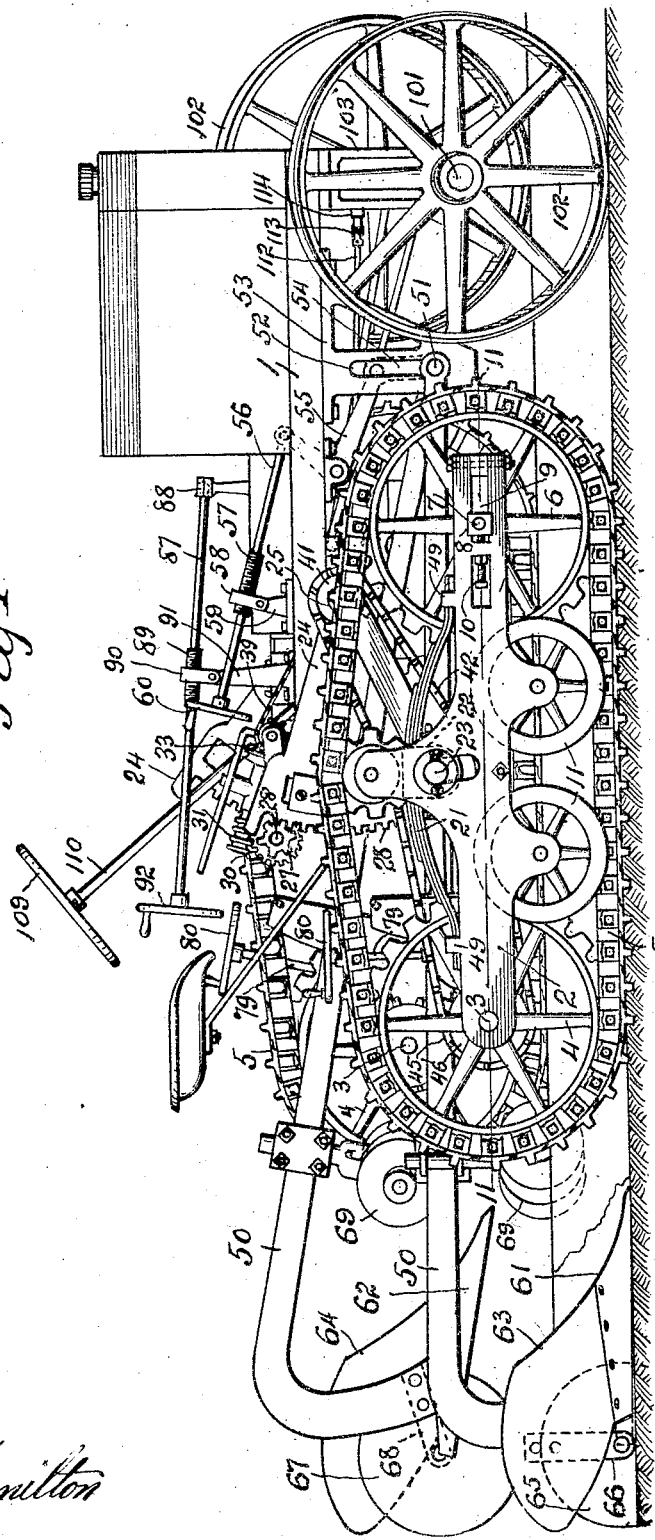

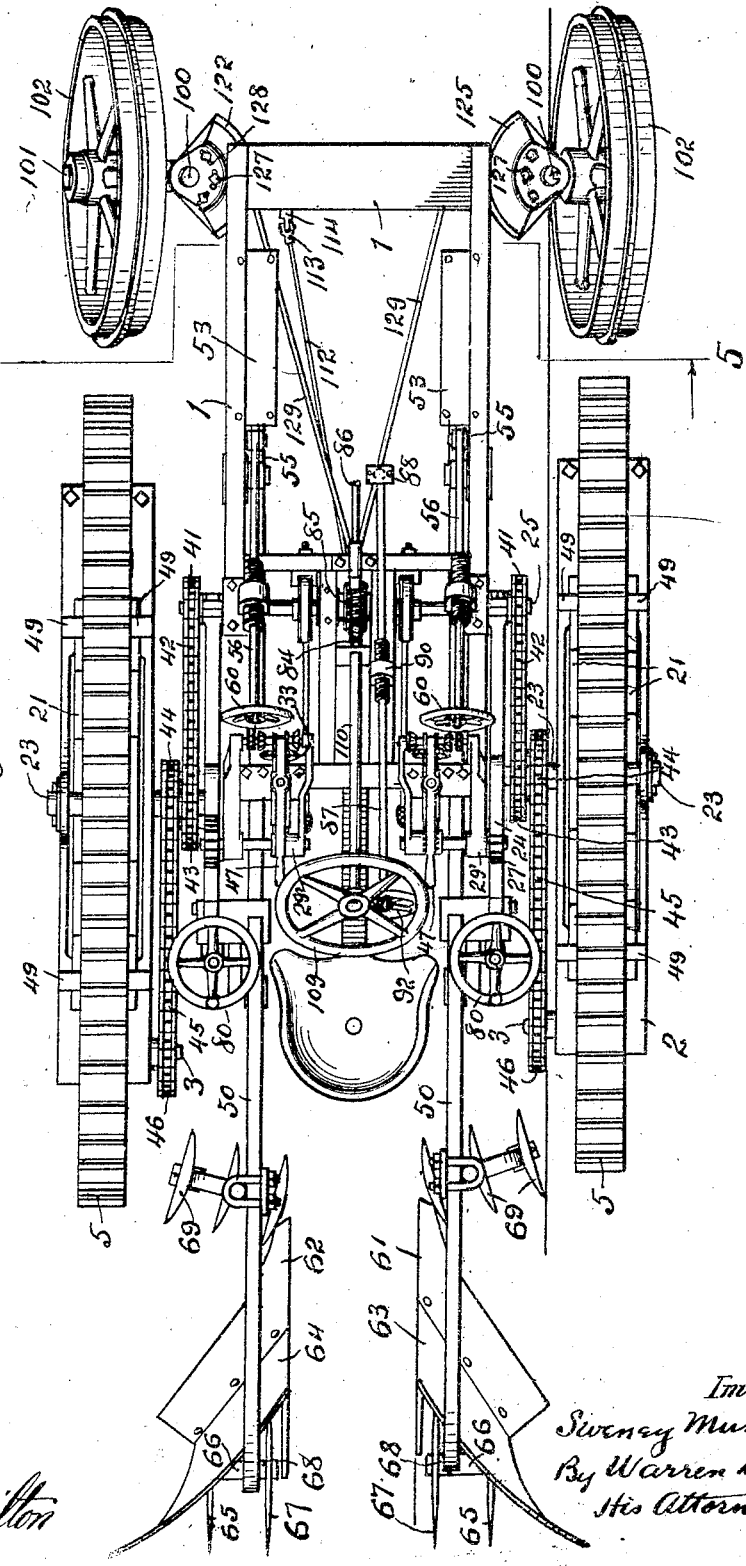

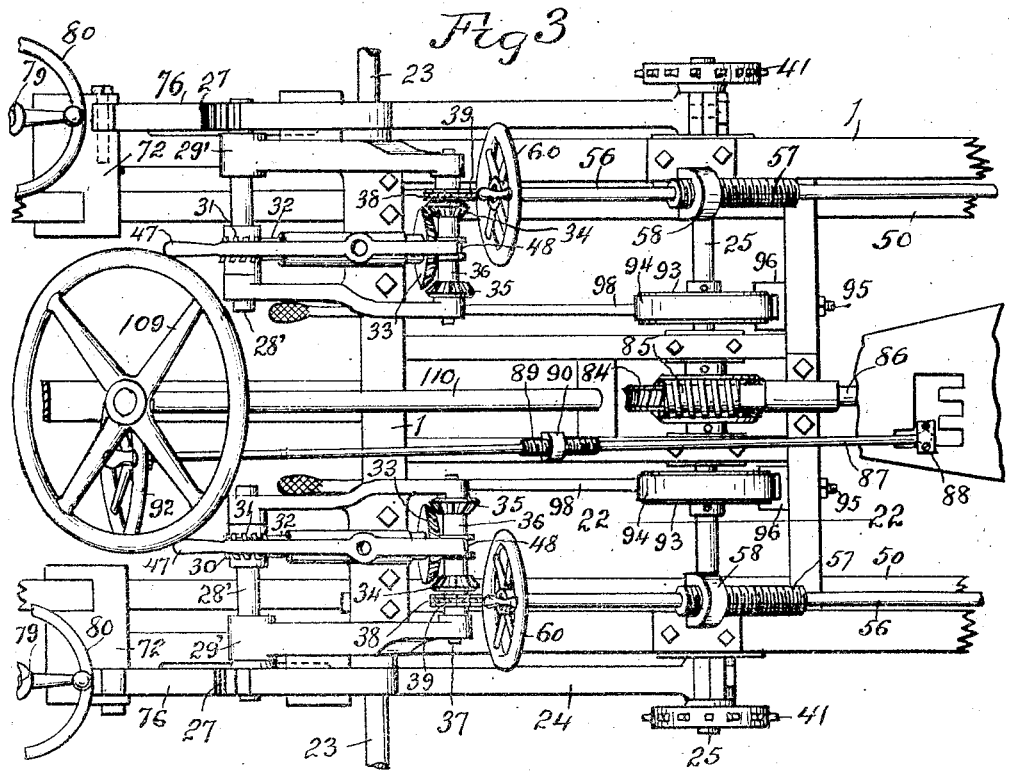
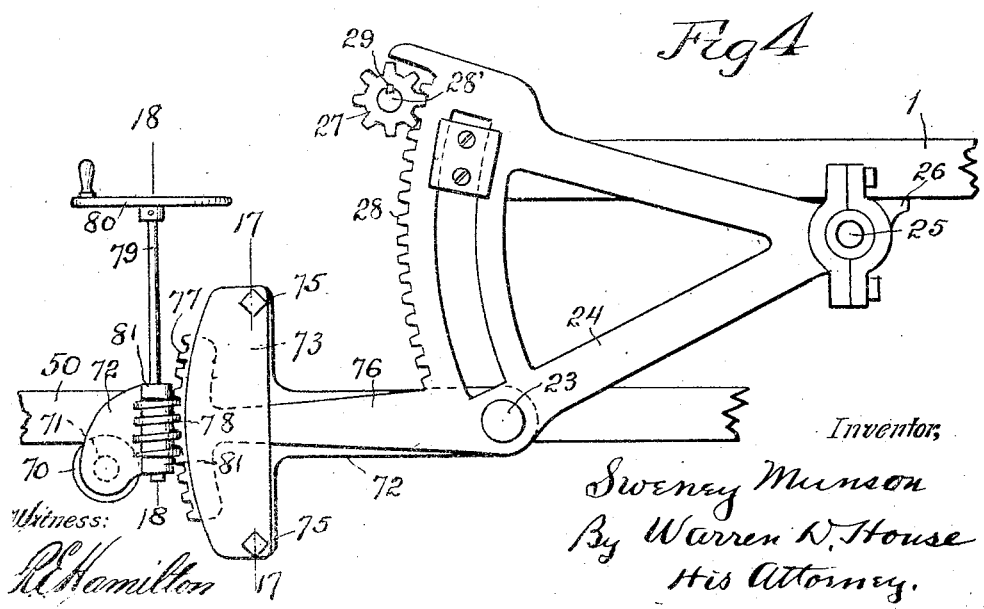

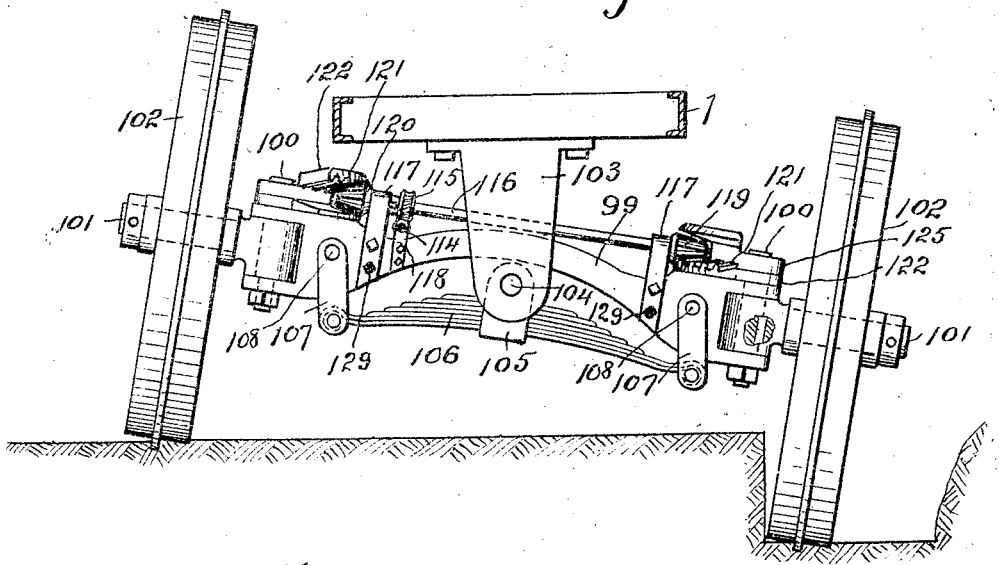
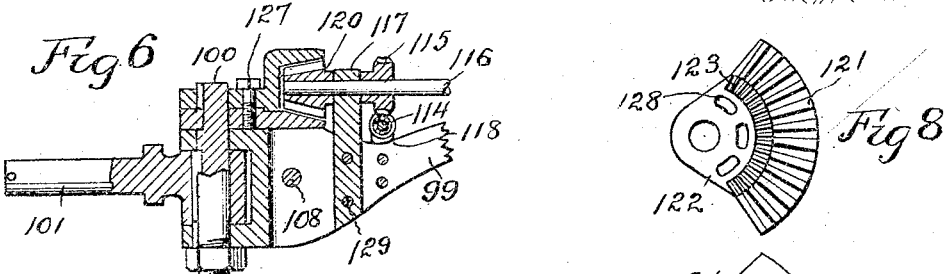
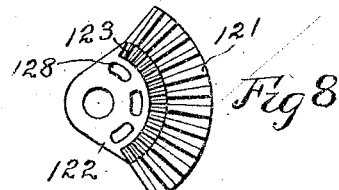
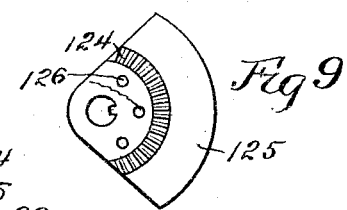
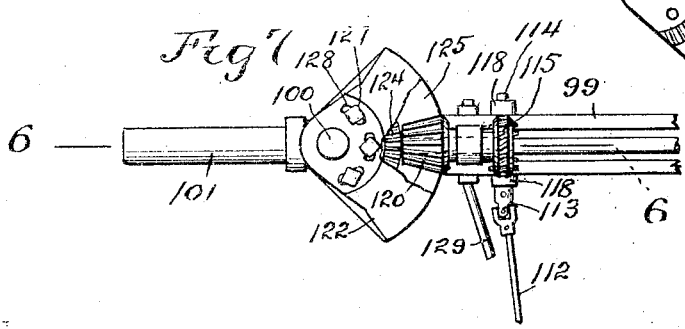

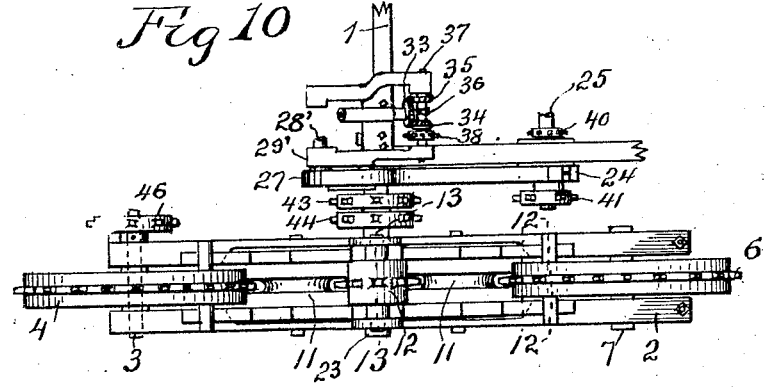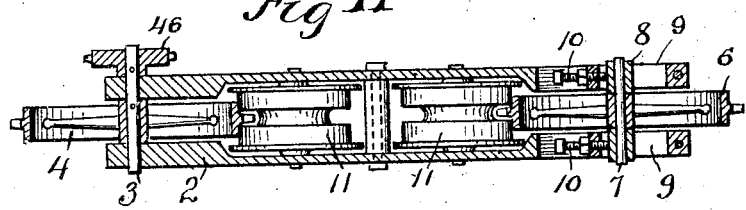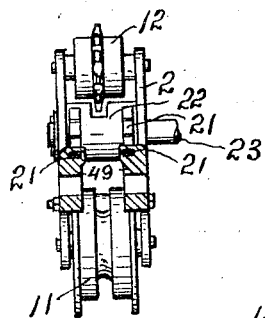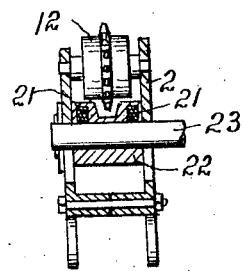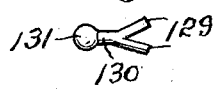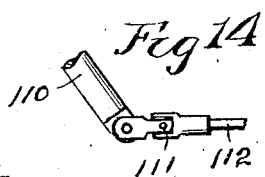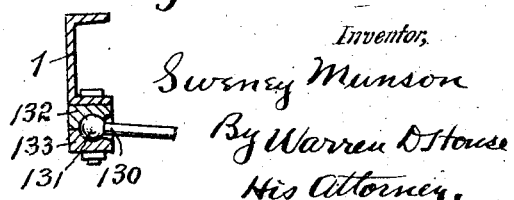

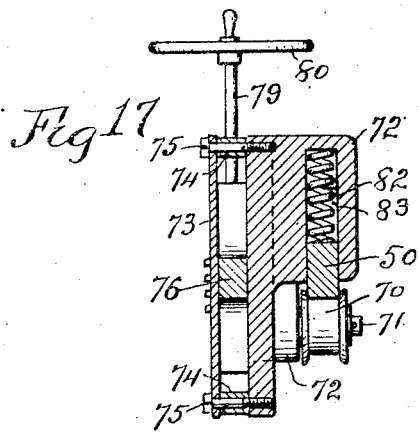
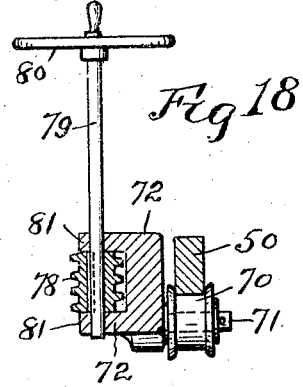
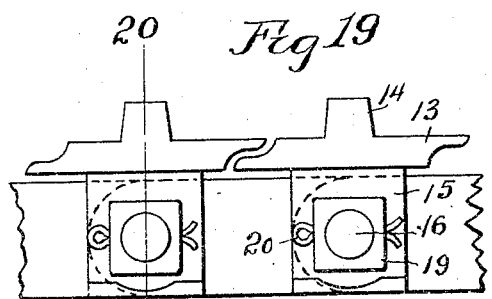
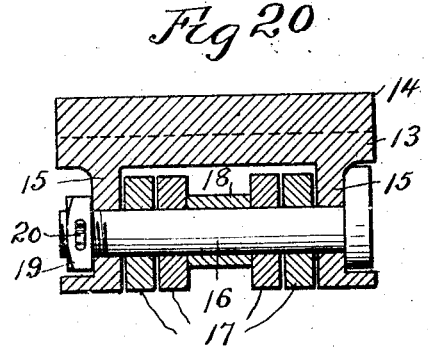
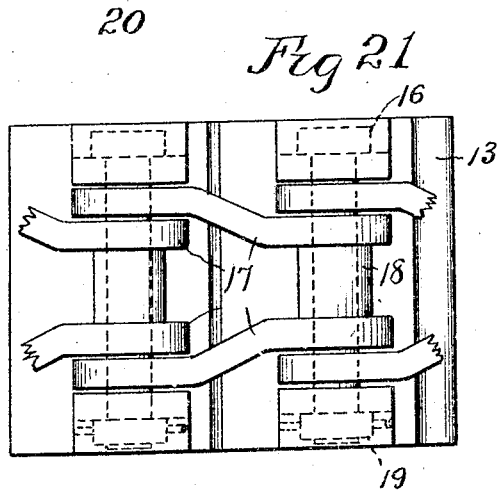
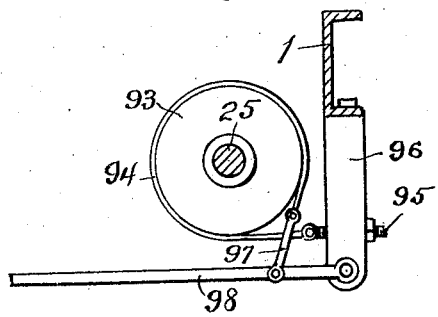

1,532,920

UNITED STATES PATENT OFFICE.

SWENEY MUNSON, OF FOWLER, COLORADO.

TRACTOR.

Application filed June 27, 1919. Serial No. 307,202.

*To all whom it may concern:*

Be it known that I, SWENEY MUNSON, a citizen of the United States, residing at Fowler, in the county of Otero and State of Colorado, have invented a certain new and useful Improvement in Tractors, of which the following is a specification.

My invention relates to improvements in tractors.

It relates particularly to tractors of the crawler or caterpiller driven type adapted for drawing one or more plows.

My invention preferably provides two crawlers for propelling the tractor and two plows arranged to be drawn by the tractor and to be used alternately for plowing back and forth.

One of the objects of my invention is to provide resilient means for supporting the main frame of the machine upon the crawler or track laying frames.

A further object of my invention is the provision of novel means for independently vertically adjusting the two plows, comprising power actuated means by which when one plow is in use, the other may be lifted clear of the ground.

My invention provides still further novel power actuated means for vertically adjusting the traction driving devices independently of each other.

My invention provides further novel subsoiling means by which the ground at the bottom of a furrow is gashed without being broken up or loosened.

My invention provides further spring actuated means for holding each plow beam in its normal operative position, but which permits the beam to rise when the plow strikes an unyielding object.

My invention provides further novel means for adjusting the plow beams with respect to the crawlers.

My invention provides still further novel means for steering the tractor.

The novel features of my invention are hereinafter fully described and claimed.

In the accompanying drawings, which illustrate the preferred embodiment of my invention, Fig. 1 is a side elevation of my improved tractor shown with one crawler and one plow running in a furrow.

Fig. 2 is a top view of the same, some of the parts being removed.

Fig. 3 is an enlarged plan view of a portion of the machine some of the parts, for clearness, being removed.

Fig. 4 is an enlarged side elevation of a portion of one of the mechanisms employed to verically adjust one of the crawlers and one of the plows.

Fig. 5 is an enlarged cross section on the line 5—5 of Fig. 2.

Fig. 6 is a vertical sectional view on the line 6—6 of Fig. 7, of a portion of the steering mechanism, enlarged.

Figs. 8 and 9 are plan views respectively of one of the gear steering segments and the clamping member which co-operates therewith.

Fig. 10 is a top view of one of the crawler frames and some of the parts connected therewith, other parts being removed.

Fig. 11 is a horizontal sectional view, some of the parts being removed, on the line 11—11 of Fig. 1.

Fig. 12 is a vertical sectional view on the line 12—12 of Fig. 10.

Fig. 13 is a vertical sectional view on the line 13—13 of Fig. 10.

Fig. 14 is a side elevation of a portion of the steering post and parts connected therewith.

Fig. 15 is a vertical sectional view of the rear end of the bifurcated steering rod and the rear support therefor.

Fig. 16 is a top view of the rear end of the bifurcated steering rod.

Fig. 17 is a vertical sectional view on the line 17—17 of Fig. 4.

Fig. 18 is a vertical sectional view on the line 18—18 of Fig. 4.

Fig. 19 is an enlarged side elevation of a portion of one of the crawler traction belts.

Fig. 20 is a cross section on the line 20—20 of Fig. 19.

Fig. 21 is an inside plan view of what is shown in Figs. 19 and 20.

Fig. 22 is a vertical sectional view on the line 22—22 of Fig. 3 showing the brake mechanism applied to one of the differential operated shafts.

Similar reference characters designate different parts in the different views.

1 designates the main frame of the machine, which is preferably a rectangular frame composed of channel beams.

For supporting the rear end of the frame 1, I provide at opposite sides respectively of the machine two crawlers of caterpiller guiding mechanisms, which are arranged for independent vertical adjustment, preferably obtained by power actuated mechanism. As the two crawlers and the mechanisms respectively supported thereby which respectively support the plow beams and which carry the rear end of the main frame are alike, a description of one of the crawlers and the mechanism it supports, will suffice.

Each crawler comprises a substantially horizontal frame 2 of any suitable construction which has rotatably mounted therein near the rear end thereof, a transverse horizontal shaft 3, Figs. 1, 10 and 11, to which is rigidly secured a large sprocket wheel 4 on which is mounted and by which is driven an endless chain track laying belt 5, which is also mounted on a sprocket wheel 6 which is mounted rotatably on a shaft 7, mounted at its ends in two boxes 8 respectively longitudinally slidably adjustible in two slots 9 provided in the frame 2 and which are respectively adjusted by means of two longitudinal screws 10 fitted respectively in screw-threaded holes provided in the frame 2. The frame 2 is further supported by means of two peripherally grooved wheels 11, rotatably mounted in the frame 2 and which receive and run upon the belt 5 where the latter rests upon the ground.

The upper portion of the belt 5 engages and is supported by a sprocket wheel 12 rotatably mounted in the central upper portion of the frame 2.

The belt 5 is preferably composed of a series of tread plates 13, Figs. 19 to 21, each provided on its outer side with a transverse rib 13, and being each provided with two inwardly extending arms 15, in which is mounted a transverse bolt 16, which is connected with the next adjacent bolts by means of links 17, two pairs of links being pivoted to each bolt and the inner links being spaced apart by a sleeve 18 mounted on the bolt 16.

Each bolt is provided with a nut 19, through which extends a cotter pin 20, which also extends through the bolt 16.

Mounted on the top of each crawler frame 2 are a series of bow-shaped leaf springs 21 which are superposed one upon the other, and which are mounted at their middle portions in a bearing member 22, which is pivotally mounted on a horizontal stud 23, Figs. 1, 4, 10, 12 and 13, which at its inner end is rigidly mounted in a swinging member 24, which is pivoted at its forward end to a driving shaft 25, mounted in a bearing 26, Fig. 4, which is attached to the frame 1. The swinging member 24 is supported and vertically adjusted by a pinion 27, which meshes with an arcuate row of teeth 28 provided on the rear edge of the member 24. The pinion 27 is secured to a horizontal shaft 28' by a key 29, the shaft 28' being rotatably mounted in a bracket 29', which is secured to the top of the frame 1.

Rigidly secured to the shaft 28' is a worm wheel 30, Figs. 1 and 3, which meshes with a worm 31, mounted upon an inclined shaft 32, which is rotatably mounted in the bracket 29' and which has rigidly secured to it a large bevel gear wheel 33, Fig. 3, and Fig. 10, which is normally disengaged from but which is adapted to selectively engage either of two bevel gear wheels 34 and 35 which are rigidly secured to and slidable with a sleeve 36 which is rotatably mounted on a horizontal shaft 37 mounted in the bracket 29', Fig. 3. The sleeve 36 has rigidly secured to it a sprocket wheel 38 which is connected by a chain belt 39 with a sprocket wheel 40, Fig. 10, which is rigidly secured to the adjacent differential driving shaft 25. The said driving shaft 25 has rigidly secured to it a sprocket wheel 41, which has mounted on it a sprocket chain 42 which is also mounted on a sprocket wheel 43 which is rotatably mounted on the stud 23 and which is rigidly secured to a sprocket wheel 44 which has mounted on it a chain belt 45, which is also mounted on a sprocket wheel 46, which is rigidly secured to the shaft 3, Figs. 1, 2, 10 and 11.

A lever 47 is pivoted to the bracket 29' and has its forward end mounted in a peripheral groove 48 in the sleeve 36. By shifting the lever 47 in the usual manner, the sleeve 36 is moved so as to engage either of the gears 34 or 35 with the gear 33. The gears 34 and 35 run continuously with the sleeve 36 and differential shaft 25. When the lever 47 is in the neutral position shown, the gear 33 is disengaged from both gears 34 and 35. At such time the worm 31 holds the worm wheel 30, shaft 28' and gear or pinion 27 stationary in the positions to which they have been last moved, thereby supporting the swinging member 24 in the position to which it has been adjusted. By swinging the lever 47 in one direction the pinion 27 and shaft 28' may be turned so as to lift the member 24. By moving the lever 47 to the opposite position, the shaft 28' and the pinion 27 will be turned so as to lower the member 24. The stud 23 may be thus raised and lowered and with it may be moved the crawler frame 2 through the intermediacy of the bearing 22 and the springs 21. The latter are mounted at their ends in transverse holes provided in upstanding projections 49 provided on the upper side of the crawler frame 2, a pair at each side of the center thereof.

Two plow beams 50 have their forward ends pivotally supported so as to be raised and lowered. As shown in Fig. 1, each plow beam is pivoted to a transverse pin 51 which extends through a slot 52 in a bracket 53 which is secured to and depends from the frame 1. The pin 51 is carried by a vertical link 54, the upper end of which is pivoted to one end of a bell crank lever 55, pivotally mounted on the frame 1 and having its other end pivoted to the forward end of an inclined rod 56 which is provided with a screw-threaded portion 57, fitted in a nut 58, which is pivoted on a transverse axis to a bearing 59 mounted on the frame 1. The rear end of the rod 56 is provided with a hand wheel 60. By turning the hand wheel 60, the forward end of the beam 50 may be raised and lowered as desired.

The beams 50 respectively carry at their rear ends right and left plow shares 61 and 62 and right and left mold boards 63 and 64, Figs. 1 and 2.

Means for sub-soiling the furrows cut by the shares 61 and 62 are provided, comprising, preferably, two pairs of rolling colters which extend respectively below the bottom of the adjacent plow share. Each pair of rolling colters comprises a rolling colter 65 which is rotatably mounted upon a depending plate 66, which is attached at its upper end to the adjacent mold board, and a rolling colter 67, which is attached rotatably to a plate 68 which is rigidly attached to the adjacent beam 50. Each pair of colters consisting of the members 65 and 67 travels in the furrow at the rear of the adjacent mold board and plow share and cuts two narrow slits in the bottom of the furrow, which permit entrance therein of water, without breaking up the earth.

Each beam 50 preferably carries forward of the adjacent plow share a gang of vertically adjustable concavo-convex disks 69 which break up the ground in advance of the adjacent share.

As best shown in Figs. 4, 17 and 18, each plow beam 50 is supported on the upper side of a peripherally grooved roller 70, which is rotatably mounted upon a horizontal pin 71 which extends inwardly from a member 72 which is pivoted at its forward end to the adjacent stud 23 and which has secured to its outer side a vertical plate 73, from which it is spaced apart by sleeves 74, respectively mounted on two screws 75. The member 24 has a rearwardly extending arm 76 located between the plate 73 and the member 72. The member 72 is vertically adjustable relatively to the arm 76. The rear end of the arm 76 is provided with a vertical arcuate row of teeth 77, Fig. 4, which engage with a vertical worm 78 rigidly secured to a vertical rod 79, which at its upper end has secured to it a hand wheel 80. The worm 78 is mounted between two ears 81 provided one above the other on the member 72 and which hold the worm from endwise movement relatively to the member 72. By turning the hand wheel 80 in the proper direction, the rear end of the member 72 and with it the roller 70, may be swung upwardly and downwardly so as to raise and lower the rear end of the beam 50 carried by the roller 70.

For normally holding the beam 50 from being lifted, each beam 50 has bearing upon its upper edge a coil spring 82, Fig. 17, located in a vertical hole 83 which extends upwardly from the under side of the adjacent member 72. The upper end of the coil spring 82 bears against the member 72 at the top of said hole. When the plow share strikes against a rock or other unyielding object, the spring 82 will yield so as to permit the plow share to rise and pass over the obstacle.

The transverse differential driving shafts 25 are connected by the usual differential driving mechanism to a central large worm wheel 84 which is rotatably mounted on the frame 1, and which meshes with a longitudinal worm 85, which is rigidly secured to the usual longitudinal driving shaft 86, of an explosive engine, not shown, carried by the frame 1.

Any usual speed changing mechanism may be employed for controlling the operation of the engine and may be operated by means of a longitudinal rod 87 which has its forward end mounted by a ball and socket joint 88 which connects the rod to the change speed mechanism, not shown. The rod 87 has a screw-threaded portion 89 which is fitted in a nut 90, which is pivotally mounted on a transverse axis to a bearing 91 supported by the frame 1. To the rear end of the rod 87 is attached a hand wheel 92, Figs. 1, 2 and 3.

Each differential driving shaft 25 may be provided with a brake of any ordinary construction. As best shown in Figs. 3 and 22, each shaft 25 has secured to it a brake wheel 93, the periphery of which is embraced by a strap 94, one end of which is secured to a bolt 95 mounted in a bracket 96 secured to and depending from the frame 1. The other end of the strap is pivotally attached to one end of a link 97, the lower end of which is pivoted to a longitudinal pedal bar 98, the forward end of which is pivoted on a transverse axis to the adjacent bracket 96. By depressing the rear end of the bar 98, the strap 94 is tightened on the wheel 93.

The tractor is provided with a front axle 99, to opposite ends of which are respectively pivoted by vertical bolts 100 two spindles 101, on which are respectively rotatably mounted two carrying wheels 102.

Depending from the front portion of the frame 1 is an inverted U-shaped bracket 103, the arms of which respectively embrace the front and rear sides of the axle 99. Extending longitudinally through the arms 103 is a horizontal bolt 104, on which is pivotally supported a bearing member 105, in which at their middle portions are mounted a plurality of leaf springs 106, superposed one above the other and supported pivotally at their ends upon two pairs of links 107, which are pivoted to the front and rear sides of the axle 99 by longitudinal horizontal bolts 108.

The axle 99 is, by the mechanism just described, adapted for vertical swinging relatively to the frame 1. By means of the springs 106, and the springs 21, which are carried by the crawlers, the main frame 1 has a spring mounting upon the crawlers and upon the front axle.

For turning the spindles 101, in steering the machine to the right or left, or to guide it straight ahead, the following described steering mechanism is preferably employed.

Referring particularly to Figs. 2, 5 to 9, and 14 to 16, 109 designates a steering wheel which is secured rigidly to the upper end of a forwardly and downwardly inclined steering post 110, which at its lower end is connected by a universal joint 111, Fig. 14, to the rear end of a substantially horizontal rod 112, the forward end of which is connected by a universal joint 113 to the rear end of a horizontal longitudinal worm 114, which meshes with a worm wheel 115, which is rigidly attached, Figs. 5, 6 and 7, to a transverse horizontal shaft 116, which is rotatably mounted above the axle 99 in two bearings 117, which are mounted on the axle 99.

The worm 114 is rotatably mounted in bearings 118 provided at the front and rear side of the axle 99.

Respectively rigidly secured to the right and left ends of the shaft 116 are two bevel gears 119 and 120. The lower side of the gear wheel 119 meshes with teeth 121 provided on the upper side of a gear segment 122 which is circumferentially adjustable on the right pin 100, and which rests upon the axle 99, and is provided on its upper side with an arcuate row of teeth 123, which are adapted to mesh with an arcuate row of teeth 124 on the under side of a plate 125, Figs. 8 and 9, which is keyed to the right pin 100 and which extends over the gear 119, and which is provided with vertical screw-threaded holes 126, through which extend respectively bolts 127, Figs. 6 and 7, which also extend through vertical slots 128, provided in the gear segment 122.

The upper side of the bevel gear 120 meshes with teeth 121 on the under side of another segmental gear plate 122, corresponding in construction, although reversed in position to the segmental gear 122 already described. The segmental gear 122 which meshes with the bevel gear 120 is circumferentially adjustable on the left pin 100 and is provided with an arcuate row of teeth 123, Fig. 8, which mesh with an arcuate row of teeth 124 on the upper side of a plate 125, the same in construction as the plate 125 already described, although reversed in position, and which is keyed or splined to the left pin 100 and which bears upon the upper side of the axle 99 and is provided with screw-threaded holes 126, Fig. 9, in which are respectively fitted vertical bolts 127, which extend through slots 128 in the adjacent segmental gear 122.

By loosening the bolts 127, the segmental gears 122 may be circumferentially adjusted with relation to the spindles 101, which are respectively keyed to the pins 100, thereby affording a proper adjustment to the spindles.

By turning the steering wheel 109 in the proper directions, the shaft 116 may be turned so as to swing the spindles 101 simultaneously in like directions for turning the machine to the right or left in steering. This effect is obtained by the engagement above described of the bevel gears 119 and 120 with the segmental gears 122, which respectively turn with the pins 100 and the spindles 101 respectively attached thereto.

For holding the front axle from swinging on a vertical axis while permitting it to swing on a horizontal longitudinal axis, it has attached rigidly to it the forward ends of two forwardly diverging arms 129 of a bifurcated rod 130, Figs. 2, 15 and 16, the rear end of which is provided with a spherical knob 131, which is pivoted to turn in any direction, between two recessed bearing plates 132 and 133, which are rigidly attached to the under side of the frame 1.

To drive the machine forward, the engine is operated so as to rotate the differential shafts 25, thereby driving the crawler belts 5 through the intermediacy of the sprocket wheels 41, chain belts 42, sprocket wheels 43 and 44, chain belts 45, sprocket wheels 46, shafts 3 and large sprocket wheels 4.

When the machine is arranged for traveling but not for plowing, the levers 47 are swung to positions such that the gears 33 will be turned so as to lift the swinging member 24, through the intermediacy of the worm shafts 32, worms 31, worm wheels 30, shafts 28', and gears 27, to the elevated position occupied by the left member 24 as shown in Fig. 1. Both beams 50 will thus be lifted so that the plow shares and rolling colters will clear the surface of the ground. At such times, the members 72 may be lifted to raise the beams 50 by means of the rollers 70 by turning the hand wheels 80, so that the worms 78 will engage the upper teeth 77.

When it is desired to plow the first furrow, the hand wheel 80 which controls the beam 50 which is to be used to plow the first furrow is turned in a direction such that the beam 50 will be lowered relatively to the adjacent member 24 below the central position shown in Fig. 4. The plow share of the lowered beam will thus cut the first furrow. At the end of the furrow, the machine is turned around, one of the levers 47 being then swung so as to effect the raising of the lowered beam, following which the adjacent hand wheel 80 is turned so as to bring the worm 78 to the central position shown in Fig. 4, in which position it will remain throughout the plowing operation.

The other lever 47 is then swung to a position in which the adjacent member 24 will be lowered to the position shown in Fig. 4, and the adjacent crawler belt 5 will be made to travel along in the furrow which has been made. The adjacent hand wheel 80 will be set in the position in which the parts will be as shown in Fig. 4, in which position the bottom of the plow share which is now turning a furrow will be at the same level as the first furrow along which the adjacent crawler belt 5 is traveling.

The worms 78, after the first furrow has been made, always occupies a central position shown in Fig. 4, during the plowing operation, and are only changed when it is desired to change the depth of a furrow or when it is desired to lift the plows clear of the ground. The hand wheels 60 are operated to vertically adjust the forward ends of the beams 50 to correspond with the adjustment of the rear ends of the beams by the turning of the hand wheels 80.

By means of the construction described, the plows and crawlers may be vertically adjusted by power operated means independently of the traveling movement of the crawlers or main frame, and joint means is provided for simultaneously vertically adjusting each crawler and the plow carried thereby.

What I claim is:—

1. In a tractor, two crawlers, two plows, headed in the same direction a main frame and means for simultaneously vertically adjusting one crawler and one plow independently of the other crawler and plow and independently of the traveling movement of the crawlers.

2. In a tractor, two crawlers, two plows, headed in the same direction a main frame, joint means for simultaneously adjusting one crawler and one plow vertically with respect to the main frame and independently of the other crawler and plow, and means for independently vertically adjusting the plows relatively to the crawlers respectively.

3. In a tractor, a tractor frame, a motor carried thereby, a shaft rotatable on said frame, means actuated by the motor for rotating said shaft, a pinion secured to and rotatable with said shaft, a swinging member pivoted to said frame and having teeth engaging said pinion, a plow beam pivoted to said frame and arranged to be supported by said swinging member, a crawler frame, a spring supported by said crawler frame and supporting said swinging member, and traction driving means mounted on said crawler frame, substantially as set forth.

In testimony whereof I have signed my name to this specification.

SWENEY MUNSON.